C. B. COTTRELL.

Printing Press.

Reissued May 10, 1881.

No. 9,700.

Witnesses

Geo. H. Haynes

A. C. Webb

Inventor

C. B. Cottrell by his Attorneys

Brown & Brown

N. PETERS, Photo-Lithographer, Washington, D. C.

UNITED STATES PATENT OFFICE.

CALVERT B. COTTRELL, OF WESTERLY, RHODE ISLAND.

PRINTING-PRESS.

SPECIFICATION forming part of Reissued Letters Patent No. 9,700, dated May 10, 1881.

Original No. 212,196, dated February 11, 1879. Application for reissue filed January 10, 1881.

DIVISION A.

*To all whom it may concern:*

Be it known that I, CALVERT B. COTTRELL, of Westerly, in the county of Washington and State of Rhode Island, have invented certain new and useful Improvements in Printing-Presses; and I do hereby declare that the following is a full, clear, and exact description of the same, reference being had to the accompanying drawings, forming part of this specification.

This invention relates to the application of air-springs in what are known as "cylinder-presses" having reciprocating beds; and the invention consists in novel means whereby the air-springs are brought into operation very gradually and without the slightest shock on any part of the press; also, in means of regulating the action of the said springs, whereby they may commence to become operative upon the bed at an earlier or later period in its stroke or travel and of regulating the force with which the said springs are made to act upon the bed.

Figure 1:
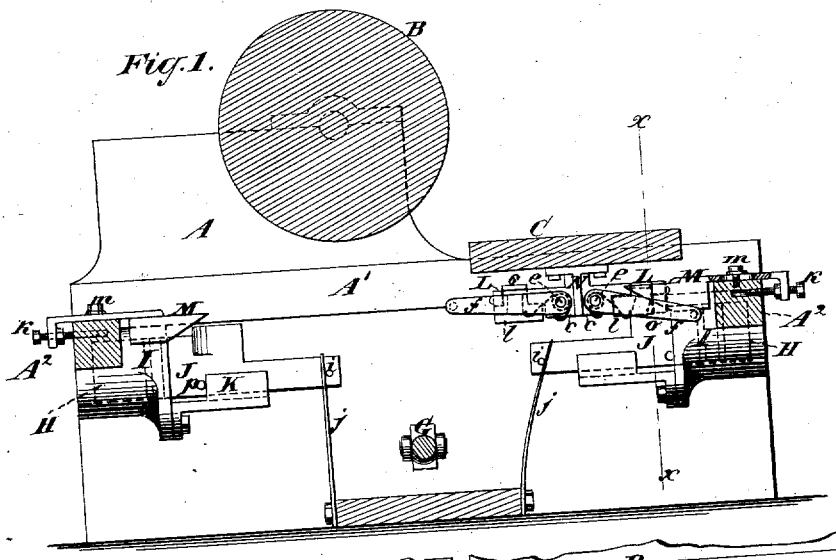
Figure 2:
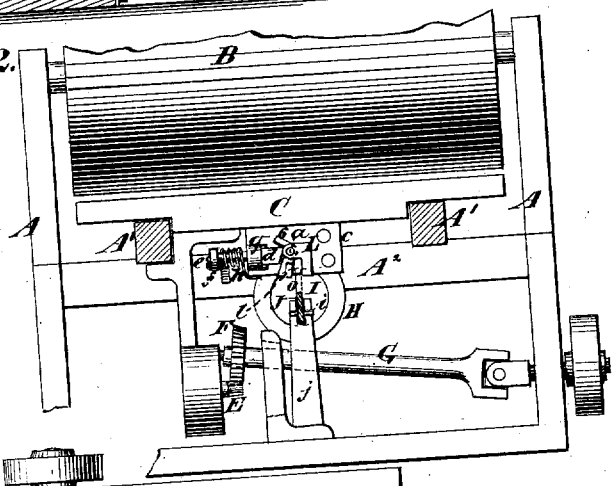
Figure 4:
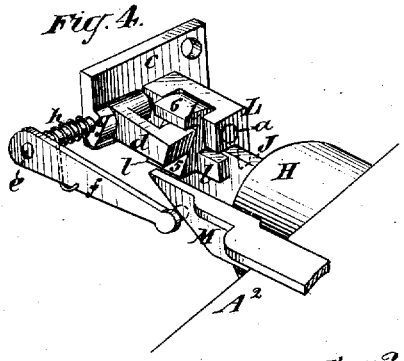
Figure 3:
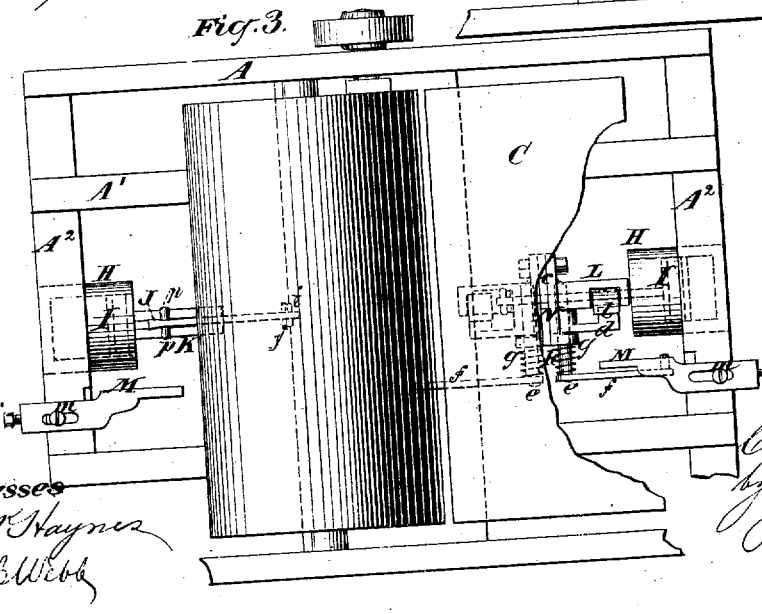

Figure 1 in the drawings is a longitudinal vertical section of a printing-press illustrating my invention, all the parts not necessary for such illustration being omitted. Fig. 2 is a transverse vertical section of the same in the line *x x* of Fig. 1. Fig. 3 is a plan of the same, with part of the bed broken away, to show the devices for connecting the air-springs with the bed at the proper time for the operation of said springs. Fig. 4 is a perspective view of the devices for engaging and disengaging the plunger of the air-spring with and from the bed of the press.

A A′ $A^2$ indicate the framing of the press. B is the impression-cylinder. C is the reciprocating bed, running on the tracks A′ A′, and having attached to it the rack E, through which it receives its reciprocating motion from the pinion F on the vibrating shaft G. All of the above parts are or may be of well-known construction.

H H are the cylinders of the air-springs, of which there is shown one for each end of the press. Each of these cylinders is bolted securely to one of the fixed cross-pieces $A^2$ $A^2$ at the ends of the framing. The said cylinders are closed at their outer ends, but open at their inner ends.

I I are the plungers of the air-springs, fitted to the said cylinders, and furnished with rods J J, which project some distance from the open inner ends of the cylinders H H, and which work in fixed guides K K, secured firmly to the said cylinders.

To opposite sides of a rigid hanger, N, (see Figs. 1 and 3,) which is rigidly secured to the under side of the reciprocating bed C, there are rigidly secured two clamps, L *l* L *l*, for taking hold of the rods J J of the air-spring plungers, and thereby connecting either of the said plungers, as required, with the said bed as the latter arrives within a suitable distance from the end of its stroke in either direction. These clamps, of which one with its operating mechanism is shown in the perspective view, Fig. 4, consist each of a fixed jaw, L, bolted securely and rigidly through its flange *c* to the hanger N, and a movable jaw, *l*, pivoted by a pin, *a*, to the said fixed jaw L.

In the flange *c* of each fixed jaw L there is a bearing, *g*, for the fulcrum-pin *e* of a cranked lever, *d e f*, the shorter arm, *d*, of which works between the inclined outer face, 5, of the respective movable jaw and an ear, 6, on the upper part of the said jaw, and the longer arm, *f*, of which projects toward one of two fixed wedges or inclined cams, M M, which are firmly secured, one to each of the fixed end pieces, $A^2$ $A^2$, of the framing of the press.

On each fulcrum-pin *e* there is coiled a spring, *h*, which operates between the flange *c* of the fixed jaw L of the clamp and the arm *f* of the lever *d e f*, to press the said arm upward, and so press its respective arm *d* against the ear 6 of the movable jaw *l*, and thereby hold the said jaw open, as shown in Fig. 2, so that as the bed C approaches to within a suitable distance from either end of the press the open clamp L *l* will receive between its jaws the upper part of the plunger rod J of the air-spring belonging to its respective end of the press. When the bed arrives in the proper position the arm *f* of the lever comes in contact with the lower inclined edge of the wedge or cam M, and by the continued movement of the lever with the bed the said arm is depressed by running under the said inclined edge, and the arm *d* is depressed against the inclined face 5 of the movable jaw *l* of the clamp, and so caused to press the said arm against the plunger-rod J, which is thereby grasped between the said jaw and the jaw L and caused to carry forward the plunger I into the air-cylinder H, and thereby produce the compression of the air in the said cylinder until the movement of the bed is arrested. As the clamp takes hold of the plunger-rod gradually it is free to slide a little way on the said rod before clamping it tightly, and hence the plunger is brought into operation without jar or shock to the bed or to the plunger. When the bed returns the coiled spring *h* raises the arm *f* of the lever *d e f*, and thereby brings the arm *d* up against the ear 6 of the jaw *l*, and thereby liberates the plunger-rod, leaving the plunger free to be forced back by the pressure of the air in the cylinder H; but as the plunger might, owing to the leakage of air or to the sticking of the plunger, fail to be returned by the pressure of the air, I provide for each plunger-rod a spring, *j*, which is secured to the lower part of the framing, and which presses against a projection, *i*, on the plunger-rod, for the purpose of drawing back, or assisting to draw back, the plunger. The backward movement of the plungers is arrested by stops *p p*, provided on their rods, coming in contact with the guides K K, as shown at the left-hand end of Fig. 1. The plungers are thereby prevented from moving too far out of their cylinders, and hence all the parts of the air-springs always remain permanently attached to the framing of the press, and are entirely detached from the bed, except at the time of their operation.

In order to provide for the regulation of the action of the air-springs, so that a greater or less compression of the air, and consequently a more or less forcible action of the springs, may be produced, and to regulate the point in the stroke of the bed at which the action of the springs is produced, the cams or wedges M M are made adjustable by means of screws *k k*, which are so connected with the said wedges and cams and with the supporting-pieces $A^2$ $A^2$ as to be capable of setting the said cams inward or outward, toward or from the bed. To secure the said wedges or cams when adjusted, binding or clamping screws *m m* are inserted through slots in the butts of said wedges or cams and screwed into the supporting-pieces $A^2$ $A^2$. The above-mentioned adjustment may be performed while the press is running.

In order to provide for the application of this system of air-springs to old presses which have the sliding bearing of the vibrating shaft G in a slotted hanger secured to a fixed cross-beam under the bed-tracks A′ A′, I make the plunger-rod with upward projections *o o*, as shown in Figs. 1 and 2, above the centers of the cylinders, so that the clamps L *l* may take hold of them so high that the said clamps and their attached levers *d e f* may pass over the said fixed cross-beam.

It will be readily understood that by making both the cylinders and plungers of the air-springs entirely detached from the bed, so that the bed moves entirely away from them and leaves them uncovered, as shown at the left-hand end of Fig. 1, all difficulty of repacking or repairing the said springs is entirely obviated.

I will remark, in conclusion, that though the particular devices and their operating mechanism herein described for the purpose of engaging the air-springs with and disengaging them from the bed are well adapted for the purpose, other and perhaps simpler devices might be employed—as, for instance, a clamping device having its jaws fixed or only slightly yielding relatively to each other, and operating in connection with a longitudinally-tapered plunger-rod, upon which the said clamp might slide with a wedge-like action.

Instead of having the air-cylinder stationary, attached to the framing of the press, and the plungers movable by but detached from the bed, it may be practicable to make the plungers stationary, attached to the framing, and the cylinders movable on the plungers by but detached from the bed.

I do not here claim the springs *j* for drawing back or assisting to draw back the plungers of the air-springs, as they constitute essential features of the claims in another division of this reissue.

What I claim as my invention is—

1. The combination, with air-springs detached from the bed and attached to the framing of the press, of clamping devices attached to the bed, for the purpose of alternately clamping the piston-rods of said springs to the bed and detaching them therefrom, substantially as and for the purpose herein described.

2. The combination, with the reciprocating bed and framing of the press, and air-springs detached from the said bed and attached to the said framing, of clamps and clamp-operating levers attached to the said bed, and fixed cams for producing the operation of the said levers, substantially as herein described.

3. The combination, with the clamps, constructed substantially as described and attached to the bed of the press, and with the air-springs, of the adjustable cam-faced arms M, for the purpose set forth.

C. B. COTTRELL.

Witnesses:
FREDK. HAYNES,
A. C. WEBB.